(12) United States Patent
Elwood et al.

(10) Patent No.: US 7,793,078 B2
(45) Date of Patent: Sep. 7, 2010

(54) MULTIPLE INSTRUCTION SET DATA PROCESSING SYSTEM WITH CONDITIONAL BRANCH INSTRUCTIONS OF A FIRST INSTRUCTION SET AND A SECOND INSTRUCTION SET SHARING A SAME INSTRUCTION ENCODING

(75) Inventors: Matthew Paul Elwood, Austin, TX (US); David John Butcher, King's Lynn (GB); Richard Roy Grisenthwaite, Nr Royston (GB)

(73) Assignee: ARM Limited, Cambridge (GB)

( * ) Notice: Subject to any disclaimer, the term of this patent is extended or adjusted under 35 U.S.C. 154(b) by 644 days.

(21) Appl. No.: 11/095,655

(22) Filed: Apr. 1, 2005

(65) Prior Publication Data

US 2006/0224861 A1   Oct. 5, 2006

(51) Int. Cl.
*G06F 9/30* (2006.01)
(52) U.S. Cl. .................................. 712/209; 712/234
(58) Field of Classification Search ................. 712/209
See application file for complete search history.

(56) References Cited

U.S. PATENT DOCUMENTS

| 5,568,646 | A | * | 10/1996 | Jaggar ........................ 712/209 |
|---|---|---|---|---|
| 5,634,119 | A | | 5/1997 | Emma et al. |
| 5,742,804 | A | | 4/1998 | Yeh et al. |
| 5,781,750 | A | * | 7/1998 | Blomgren et al. ............ 712/209 |
| 6,021,489 | A | | 2/2000 | Poplingher |
| 6,356,997 | B1 | | 3/2002 | Krishnan et al. |
| 6,701,426 | B1 | | 3/2004 | Ries et al. |
| 2002/0056036 | A1 | * | 5/2002 | Topham ....................... 712/209 |
| 2004/0024991 | A1 | * | 2/2004 | Chauvel et al. ............. 712/209 |
| 2004/0255097 | A1 | * | 12/2004 | Seal et al. .................... 712/209 |

FOREIGN PATENT DOCUMENTS

WO   WO 2004/111836   12/2004

OTHER PUBLICATIONS

T. Y. Yeh and Y. N. Patt. Two-level adaptive training branch prediction. In Proceedings of the 24th Annual International Symposium on Microarchitecture, pp. 51-61, Nov. 1991.*
Translation of Chinese official action, Apr. 25, 2008, in corresponding Chinese Application No. 200610073740.3.

* cited by examiner

*Primary Examiner*—Eddie P Chan
*Assistant Examiner*—Keith Vicary
(74) *Attorney, Agent, or Firm*—Nixon & Vanderhye P.C.

(57) ABSTRACT

A data processing system is operable in a first state to use a first instruction set having a first instruction set encoding. The data processing system is also operable in a second state to use a second instruction set having a second instruction encoding. Conditional branch instructions provided within the two different instruction sets are arranged to use the same instruction encoding.

22 Claims, 4 Drawing Sheets

MULTIPLE INSTRUCTION SET DATA PROCESSING SYSTEM WITH CONDITIONAL BRANCH INSTRUCTIONS OF A FIRST INSTRUCTION SET AND A SECOND INSTRUCTION SET SHARING A SAME INSTRUCTION ENCODING

BACKGROUND OF THE INVENTION

1. Field of the Invention

This invention relates to data processing systems. More particularly, this invention relates to data processing systems supporting multiple program instruction instruction sets.

2. Description of the Prior Art

It is known to provide data processing systems operable to process data under native control of program instructions of multiple instruction sets. An example of such systems are the microprocessor designs supporting the ARM and Thumb instruction sets produced by ARM Limited of Cambridge, England. These microprocessors are operable in an ARM state in which they execute 32-bit ARM instructions and in a Thumb state in which they execute 16-bit or 32-bit Thumb instructions. Whilst the instruction sets of the ARM and Thumb instructions are related, the instruction encodings used are different and typically separate instruction decoders are provided for each of the instruction sets.

Within highly pipelined implementations of such systems, the decoding of the instructions may take place at several different stages along the pipeline. For example, some decoding may take place early in the pipeline associated with branch prediction. In these circumstances, the need to track the current state of the processor in association with the instructions being passed along the pipeline, as well as to operate appropriately upon those instructions in the early pipeline stages, imposes a disadvantageous additional overhead.

SUMMARY OF THE INVENTION

Viewed from one aspect the present invention provides apparatus for processing data, said apparatus comprising:

an instruction decoder operable in a first state to decode program instructions to control data processing operations in accordance with an instruction encoding of a first instruction set and in a second state to decode program instructions to control data processing operations in accordance with an instruction encoding of a second instruction set; wherein at least conditional branch instructions of said first instruction set and conditional branch instructions of said second instruction set share a substantially common instruction encoding.

An instruction encoding provides the mapping between instructions/operations selected by the programmer to be performed and the bit patterns supplied to the processor to control the processor to perform the instructions/operations. The present technique recognises that within a system supporting multiple instruction sets, each being active in a respective state of the processor, with separate instruction encodings, an advantage can be gained if at least the conditional branch instructions of the first instruction set and the conditional branch instructions of the second instruction set share a substantially common instruction encoding. For performance reasons, conditional branch instructions are often subject to identification and serve to influence the behaviour of the system, e.g. subject to prediction in an attempt to reduce pipeline stalls, at the early stages in the instruction pipeline. Using a substantially common instruction encoding for these conditional branch instructions allows for an advantageous reduction in the overhead required to support actions based upon these conditional branch instructions early within the pipeline. Slight differences in the operations specified by a particular instruction should be regarded as not changing the instruction encoding, e.g. an LDR Rd, [Rm, Rn] instruction in different instruction sets may calculate the address as either Rm+Rn or Rm+Rn*4. This is nevertheless regarded as a substantially common encoding since it may be decoded with substantially the same decoding hardware. It could be only conditional branch instructions which share a substantially common encoding, but it is nevertheless, given a different set of design aims, also possible for both conditional and unconditional branch instructions to share a substantially common encoding.

Whilst it will be appreciated that the different instruction sets active in the different respective states of the processor could share all of their branch instruction encodings, this is not necessarily the most efficient use of instruction encoding bit space as some branch instructions may only be justified within one of the instruction sets. In accordance with this, some embodiments are such that the second instruction set includes at least one unconditional branch instruction having an instruction encoding corresponding to a different data processing operation in the first instruction set.

Thus, an unconditional branch instruction of a particular type which may only be required in one of the instruction sets can have its instruction encoding bit space reused for a different data processing operation which is more useful to the other instruction set.

The relationship between the two instruction sets could provide a variable degree of functional overlap and overlap between the instruction encodings being used. An efficient implementation is one in which there is a high degree of commonality between the instruction encodings of the two instruction sets thereby allowing resource reuse within the system for those processing operations which are generally required by both instruction sets and yet each instruction set is provided with at least some instruction encodings which correspond to unique processing operations for that instruction set and different processing operations in the other instruction set.

The switching between states of the system in order to switch between the instruction set in use is conveniently controlled by a current processor status register storing one or more state bits.

Whilst it will be appreciated that the usefulness of sharing a common encoding for conditional branch instructions within different instruction sets has a variety of advantages, it is particularly useful in systems having a branch prediction mechanism since such a branch prediction mechanism can then operate independently of whether or not the systems in the first state or the second state as the encodings of the instructions that are most likely to influence the operation of the branch prediction mechanism are shared. Since unconditional branch instructions are always taken, they are easy to predict and do not pose the same difficulties.

Such branch prediction mechanism can have a variety of forms, such as including one or more of: a branch target buffer; one or more history registers storing a history value indicative of respective branch outcomes for a sequence of previously encountered branch instructions; and the like. In the context of a system including a history value within the branch prediction mechanism and having a second instruction set including at least one unconditional branch instruction with an instruction encoding corresponding to a different data processing operation in the first instruction set, it is convenient if the history value is not updated in respect of such an unconditional branch instruction. Such unconditional branch instructions which are anything other than taken (e.g. not taken due to a predication instruction) are statistically rare and accordingly this loss of resolution within the history value is not significant and eases implementation.

Viewed from another aspect the present invention provides a method of processing data, said method comprising:

in a first state, decoding program instructions to control data processing operations in accordance with an instruction encoding of a first instruction set; and in a second state, decoding program instructions to control data processing operations in accordance with an instruction encoding of a second instruction set; wherein at least conditional branch instructions of said first instruction set and conditional branch instructions of said second instruction set share a substantially common instruction encoding.

A complementary aspect of the invention is the provision of a computer program product carrying the computer program for controlling a data processing apparatus to operate in accordance with the above techniques, such as a computer program including at least one instruction from each of the two instruction sets. The computer program product may, for example, be carried by a physical medium or may be transmitted.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
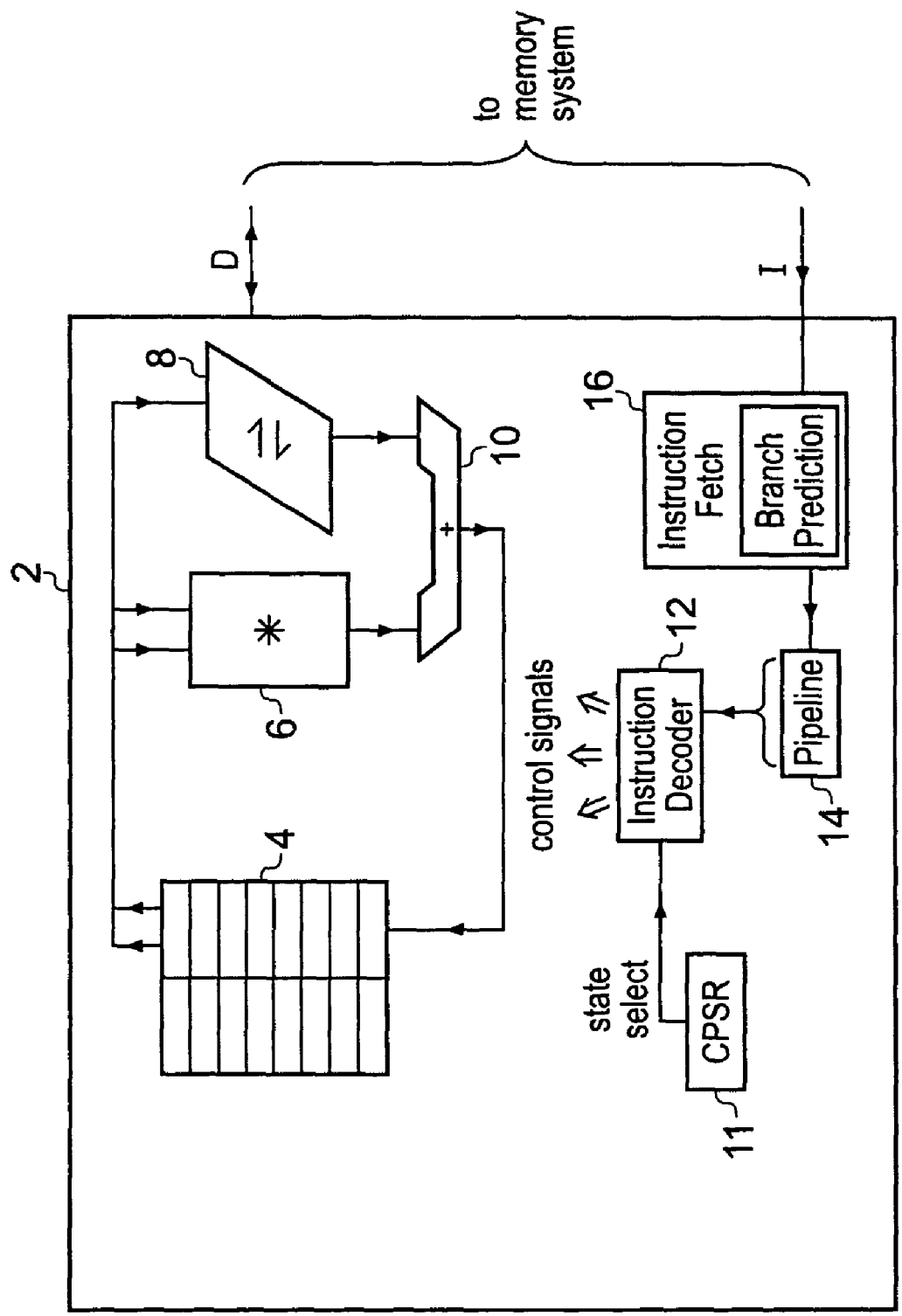
FIG. 1 schematically illustrates a data processing apparatus supporting multiple states each having a corresponding instruction set for controlling processing operations.

FIG. 1 illustrates a data processing system 2 operable to perform data processing operations upon data values stored within a register bank 4 using a multiplier 6, a shifter 8 and an adder 10 all acting under control of an instruction decoder 12 (separate instruction decoders may also be used for respective instruction sets). It will be appreciated that FIG. 1 is simplified representation and a typical data processing system, such as a microprocessor, would contain many more circuit elements. It will also be appreciated that the instruction decoder 12 need not be provided as a separate element in its own right, but that instruction decoding may be performed within other circuit elements/blocks. Such alternatives are encompassed herein. Program instructions are fetched to an instruction pipeline 14 by an instruction fetch unit 16 from a memory system. The program instructions within the instruction pipeline 14 are decoded by the instruction decoder 12 to produce control signals which configure the register bank 4, the multiplier 6, the shifter 8 and the adder 10 to provide data processing operations.

A current processor status register 11 stores a value including one or more state bits indicating a state of the data processing system 2 corresponding to which of multiple instruction sets are currently active. These instruction sets may be a first instruction set and a second instruction set. Systems are also possible having more than two instruction sets. Depending upon the current state, the instruction decoder 12 uses different instruction encodings to interpret the program instructions within the instruction pipeline 14 and generate the appropriate control signals. In the present technique the first instruction set and the second instruction set each have different instruction set encodings but these overlap for at least the conditional branch instructions of each of the instruction sets so as to have a common instruction encoding for the conditional branch instructions.

Figure 2:
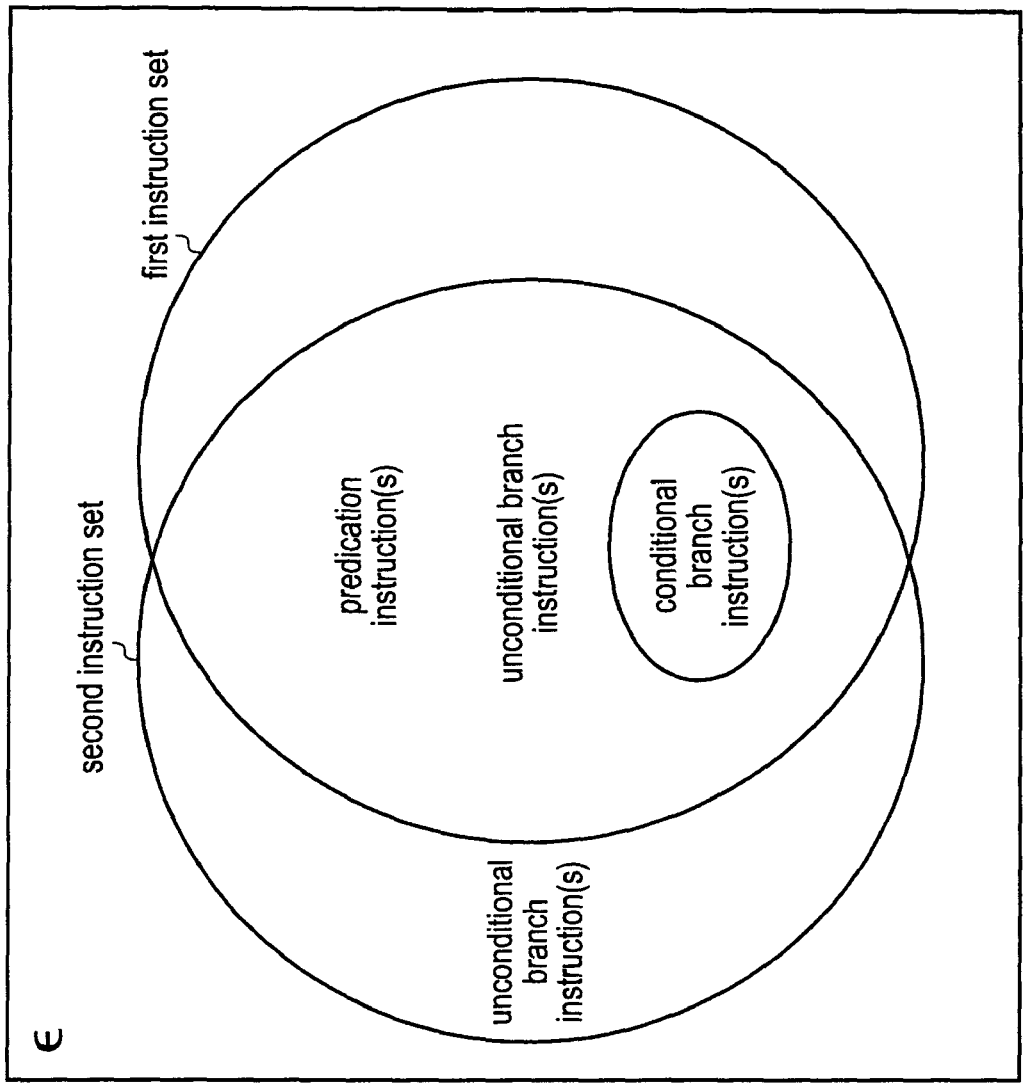
FIG. 2 is a Venn diagram illustrating the relationship between a first instruction set and a second instruction set.

FIG. 2 is a Venn diagram illustrating the relationship between encodings of the first instruction set and the second instruction set. As illustrated, the intersection between the instruction sets includes at least the conditional branch instructions of each of the instruction sets. The union also includes at least some unconditional branch instructions as well as at least one predication instruction (discussed later). It will also be seen that each of the instruction sets has a unique portion which includes instruction encodings corresponding to particular processing operations which are either not present or are used differently in the other of the instruction sets. In the example illustrated, the second instruction set includes at least some unique unconditional branch instructions. It is also possible in different embodiments that the encodings of all unconditional branch instructions will be common and in the intersection.

Figure 3:
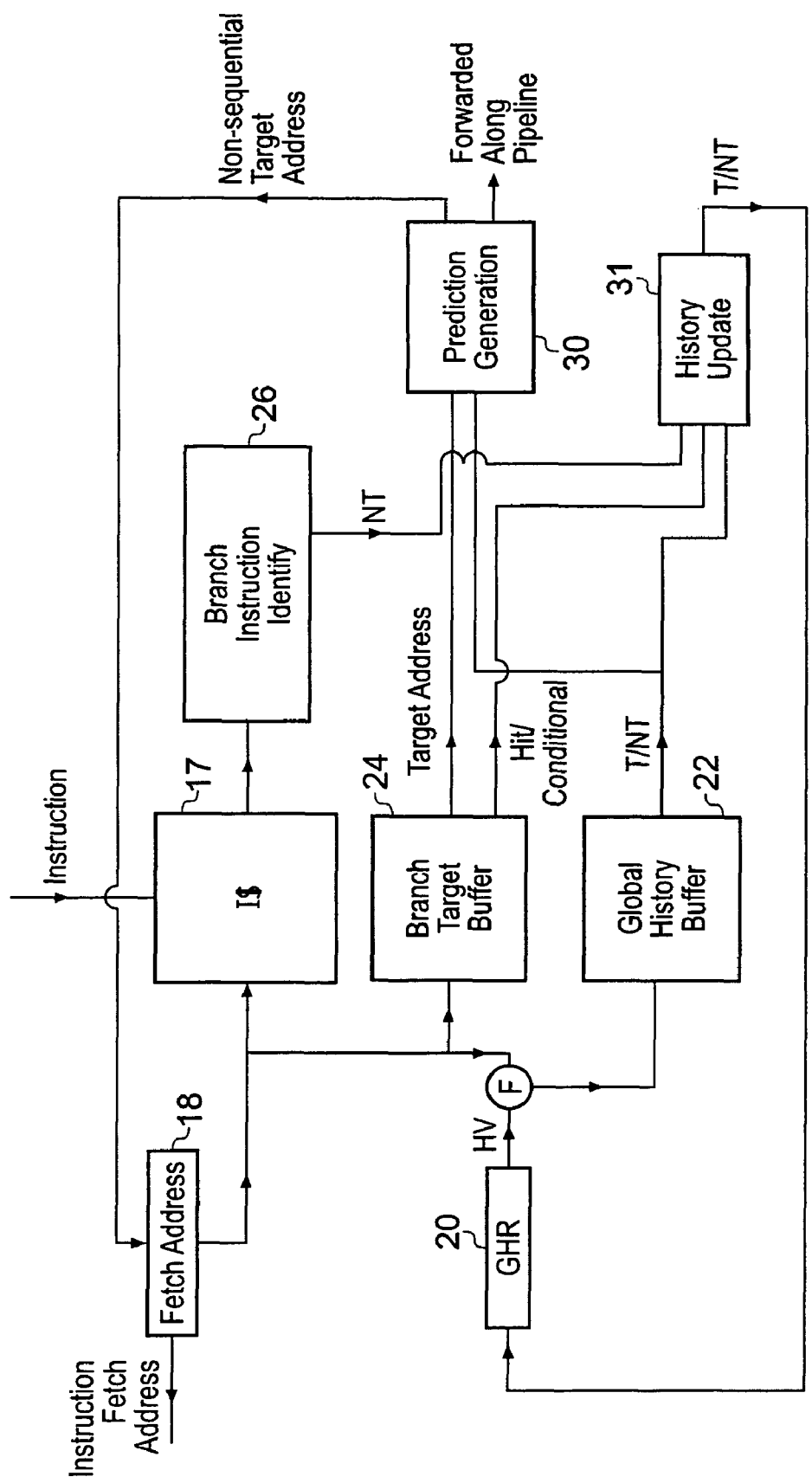
FIG. 3 is a diagram schematically illustrating a branch prediction mechanism within the system of FIG. 1.

FIG. 3 schematically illustrates a branch prediction mechanism within the instruction fetch unit 16. Instructions are fetched from an instruction cache 17 from fetch addresses stored within a fetch address register 18. The fetch address register 18 stores a program counter value indicating the address to be associated with those program instructions when they are issued into the instruction pipeline 14. The instruction cache 17 is a small cache locally storing a few program instructions which are issued into the pipeline. The fetch addresses (program counter values) associated with the program instructions are passed down the instruction pipeline together with the program instructions to which they relate. In practice, an instruction queue may be provided, but this is not illustrated herein for simplicity.

As will be appreciated by those skilled in this field, the instruction fetch unit 16 prefetches instructions and issues these into the instruction pipeline 14 before the final outcome of preceding instructions has been determined. Accordingly, the sequence of instructions fetched is based upon a prediction of the program flow that will be followed. Program flow is normally sequential, but branch instructions can alter this and accordingly it is important that branch instructions be identified and a prediction made as to whether or not that branch will be followed.

The branch prediction mechanism illustrated in FIG. 3 includes a global history register 20 which stores the taken or not taken outcome of a sequence of previously encountered branch instructions within the program flow. This pattern of outcomes is used to identify a branch instruction that is encountered and to address into a global history buffer 22 (other possible embodiments may have multiple history buffers or registers) where a prediction of taken or not taken for that encountered branch instruction can be stored. The addressing into the global history buffer 22 may also be dependent upon part of the instruction address. A global history register 20 is then updated with a history update circuit 31 with the outcome that has been predicted and can be used to predict an outcome for the next encountered conditional branch instruction based upon a correlation between the next fetched conditional branch instruction and the outcome of previously encountered branches. Efforts to update the global history value clearly improve prediction accuracy. If the prediction made turns out to be incorrect, then the global history register value 20 is subsequently corrected and the prediction stored within the global history buffer amended. The prediction can be multi-levelled, e.g. strongly taken or weakly taken, weakly not taken and strongly not taken in order to provide a degree of prediction hysteresis as desired.

Another aspect of branch prediction is being able to determine as rapidly as possible, or at least predict, the branch target address of an encountered branch target instruction. The branch target address may not be determined at the time that the branch instruction concerned is fetched, but if that branch instruction has previously been encountered, then a good prediction is that the branch target will be the same as previously used by that branch instruction. Accordingly, a branch target buffer 24 serves to cache branch target addresses or taken branches. These cached branch target addresses can then be used to enable the prefetch unit to start fetching instructions from the branch target location based upon the predicted branch target address.

A branch identifying circuit 26 serves to identify branch instructions fetched in the program instruction stream based upon a partial hard wired decoding thereof. These branch instructions include conditional branch instructions and unconditional branch instructions that are common to both instruction sets. [Non-common unconditional branch instruction encodings are not decoded, but they are only not taken if predicated, which is rare.] This decoding is simplified since the conditional branch instructions of the first and second instruction sets share a common encoding. The branch instruction identifying circuit 26 also makes a default not taken indication for encountered branch instructions of either form which is used if the other branch prediction mechanisms do not indicate that the branch instruction concerned has previously been encountered. The identification of branch instructions by the branch instruction identifying circuit 26 is also used to trigger the action of the global history register 20, global history buffer 22 and branch target buffer 24 to perform their various lookups and updates in dependence upon the instruction fetch address stored within the instruction fetch address register 18 as previously discussed. A prediction generation circuit 30 issues branch taken predictions into the instruction pipeline. [If there is no predication instruction within the instruction set, then unconditional branches don't need to be decoded by the branch instruction identifying circuit 26, since such branches will be flushed if not predicted taken. If predicted taken, then the branch target buffer 24 will generate the taken result to be pushed onto the global history register 20.]

Figure 4:
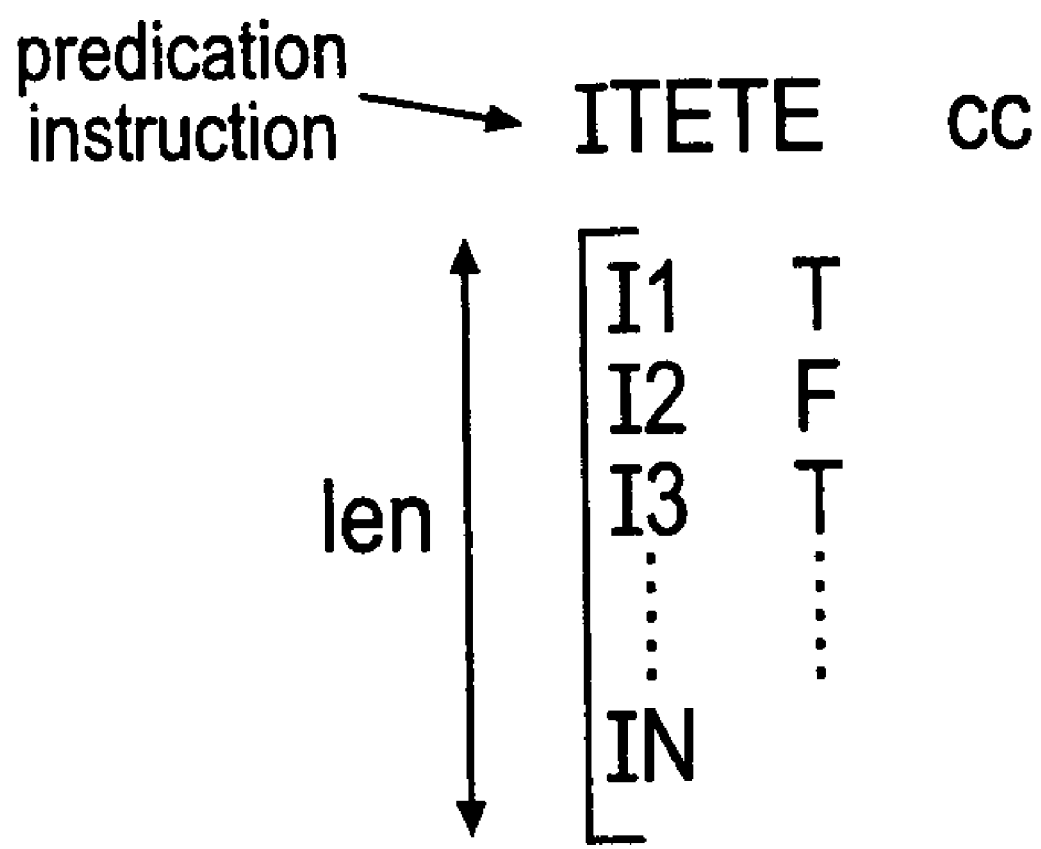
FIG. 4 is a diagram schematically illustrating a predication instruction.

FIG. 4 schematically illustrates a predication instruction IT which can be used to predicate (e.g. render conditional) a variable number of following program instructions (which may or may not themselves be conditional). The predication instruction IT specifies condition codes cc which will control its operation. These condition codes can be such as the status of a zero flag, the status of a carry flag and the like. The IT instruction also specifies the number of following program instructions which it will predicate together with an indication of whether the individual program instructions that are predicated either execute when the condition codes are passed or when the condition codes are failed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   an instruction decoder configured in a first state to decode program instructions to generate control signals which control the apparatus to perform data processing operations in accordance with an instruction encoding of a first instruction set and in a second state to decode program instructions to generate control signals which control the apparatus to perform data processing operations in accordance with an instruction encoding of a second instruction set; wherein
   at least conditional branch instructions of said first instruction set and conditional branch instructions of said second instruction set share a same instruction encoding,
   wherein each instruction encoding is a specific pattern of binary numbers that identifies the instruction and distinguishes the instruction from other instructions.

2. Apparatus as claimed in claim 1, wherein said second instruction set includes at least one unconditional branch instruction having an instruction encoding corresponding to a different data processing operation in said first instruction set.

3. Apparatus as claimed in claim 1, wherein said first instruction set has one or more program instructions corresponding to data processing operations not supported by said second instruction set and said second instruction set has one or more program instructions corresponding to data processing operations not supported by said first instruction set.

4. Apparatus as claimed in claim 1, comprising a current processor status register configured to store one or more state bits controlling said instruction decoder to operate in said first state and decode program instructions in accordance with said first encoding or to operate in said second state and decode program instructions in accordance with said second encoding.

5. Apparatus as claimed in claim 1, comprising a branch prediction mechanism, said same instruction encoding allowing said branch prediction mechanism to operate independently of whether said apparatus is in said first state or in said second state.

6. Apparatus as claimed in claim 5, wherein said branch prediction mechanism includes a branch target buffer configured to store addresses of previously encountered taken branch instructions.

7. Apparatus as claimed in claim 6, wherein said branch prediction mechanism includes at least one history register configured to store a history value indicative of respective branch outcomes for a sequence of previously encountered branch instructions and said branch prediction mechanism is configured to at least partially decode program instructions to identify unpredicted branch instructions and predicting them as not taken for updating said history value.

8. Apparatus as claimed in claim 7, wherein said second instruction set includes at least one unconditional branch instruction having an instruction encoding corresponding to a different data processing operation in said first instruction set and said history value is not updated in respect of any not taken unconditional branch instruction having an instruction encoding corresponding to a different data processing operation in said first instruction set.

9. Apparatus as claimed in claim 1, wherein at least one of said first instruction set and said second instruction set includes one or more predication instructions configured to predicate one or more following program instructions.

10. Apparatus as claimed in claim 1, wherein both conditional and unconditional branch instructions of said first instruction set and both conditional and unconditional branch instructions of said second instruction set share same instruction encoding.

11. A method of processing data, said method comprising:
in a first state, decoding program instructions to generate control signals which control a data processor to perform data processing operations in accordance with an instruction encoding of a first instruction set; and
in a second state, decoding program instructions to generate control signals which control the data processor to perform data processing operations in accordance with an instruction encoding of a second instruction set; wherein
at least conditional branch instructions of said first instruction set and conditional branch instructions of said second instruction set share a same instruction encoding,
wherein each instruction encoding is a specific pattern of binary numbers that identifies the instruction and distinguishes the instruction from other instructions.

12. A method as claimed in claim 11, wherein said second instruction set includes at least one unconditional branch instruction having an instruction encoding corresponding to a different data processing operation in said first instruction set.

13. A method as claimed in claim 11, wherein said first instruction set has one or more program instructions corresponding to data processing operations not supported by said second instruction set and said second instruction set has one or more program instructions corresponding to data processing operations not supported by said first instruction set.

14. A method as claimed in claim 11, wherein a current processor status register stores one or more state bits for selecting operation in one of said first state and said second state.

15. A method as claimed in claim 11 wherein said same instruction encoding allows a branch prediction mechanism to operate independently of whether said method is in said first state or in said second state.

16. A method as claimed in claim 15, wherein said branch prediction mechanism includes a branch target buffer configured to store addresses of previously encountered taken branch instructions.

17. A method as claimed in claim 16, wherein said branch prediction mechanism includes at least one history register storing a history value indicative of respective branch outcomes for a sequence of previously encountered branch instructions and said branch prediction mechanism is configured to at least partially decode program instructions to identify unpredicted branch instructions and predicting them as not taken for updating said history value.

18. A method as claimed in claim 17, wherein said second instruction set includes at least one unconditional branch instruction having an instruction encoding corresponding to a different data processing operation in said first instruction set and said history value is not updated in respect of any not taken unconditional branch instruction having an instruction encoding corresponding to a different data processing operation in said first instruction set.

19. A method as claimed in claim 11, wherein at least one of said first instruction set and said second instruction set includes one or more predication instructions configured to predicate one or more following program instructions.

20. A method as claimed in claim 11, wherein both conditional and unconditional branch instructions of said first instruction set and both conditional and unconditional branch instructions of said second instruction set share a same instruction encoding.

21. A computer program product carrying a computer program provided on a computer-readable physical medium and including program code configured to control a data processing apparatus to process data in accordance with the following:
in a first state, decoding program instructions to generate control signals which control a data processor to perform data processing operations in accordance with an instruction encoding of a first instruction set; and
in a second state, decoding program instructions to generate control signals which control the data processor to perform data processing operations in accordance with an instruction encoding of a second instruction set; wherein
at least conditional branch instructions of said first instruction set and conditional branch instructions of said second instruction set share a same instruction encoding,
wherein each instruction encoding is a specific pattern of binary numbers that identifies the instruction and distinguishes the instruction from other instructions.

22. Apparatus for processing data, said apparatus comprising:
instruction decoder means for operating in a first state to decode program instructions to generate control signals which control the apparatus to perform data processing operations in accordance with an instruction encoding of a first instruction set and in a second state to decode program instructions to generate control signals which control the apparatus to perform data processing operations in accordance with an instruction encoding of a second instruction set; wherein
at least conditional branch instructions of said first instruction set and conditional branch instructions of said second instruction set share a same instruction encoding,
wherein each instruction encoding is a specific pattern of binary numbers that identifies the instruction and distinguishes the instruction from other instructions.

* * * * *